Oct. 22, 1968   J. H. BUSH ET AL   3,406,831
FILTER CARTRIDGE FOR FILTERING LIQUIDS
Filed Nov. 23, 1965                                2 Sheets-Sheet 1

INVENTORS
John H. Bush
John E. Weyand
BY Pennie, Edmonds,
Morton, Taylor & Adams
ATTORNEYS Oct. 22, 1968 J. H. BUSH ET AL 3,406,831
FILTER CARTRIDGE FOR FILTERING LIQUIDS
Filed Nov. 23, 1965 2 Sheets-Sheet 2

INVENTORS
John H. Bush
John E. Weyand
BY Pennie Edmonds
Morton, Taylor & Adams
ATTORNEYS United States Patent Office 3,406,831
Patented Oct. 22, 1968

3,406,831
FILTER CARTRIDGE FOR FILTERING LIQUIDS
John H. Bush and John E. Weyand, Needham, Mass., assignors to Millipore Filter Corporation, Bedford, Mass., a corporation of Massachusetts
Filed Nov. 23, 1965, Ser. No. 509,384
11 Claims. (Cl. 210—438)

ABSTRACT OF THE DISCLOSURE

A filter cartridge comprising a tubular element constructed of individual sections connected together and having passageways connecting the interior thereof to the exterior, and a filter secured to the exterior of the element.

---

Figure 1:
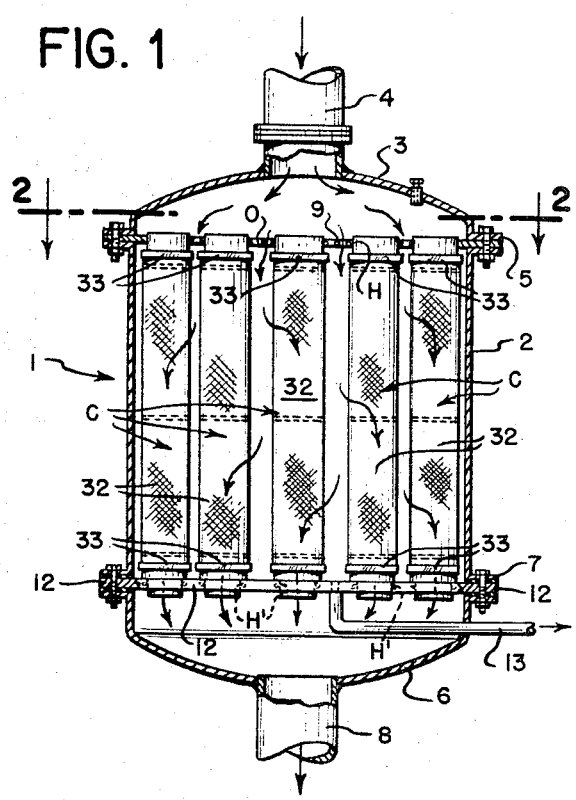

This invention relates to filter cartridges for filtering various liquids, and provides an improved filter cartridge. The filter cartridge has effective use for filtering liquids such as fuels, solvents, or aqueous liquids for the removal of solid particulate contaminants. The filter cartridge is also effective for the removal of foreign contaminants from non-aqueous base solutions and the removal of undissolved water. The invention is advantageously concerned with cartridges for filtering petroleum fuels for use in jet aircraft engines, and the like.

The invention provides filter cartridges adapted to be removably installed in an enclosed vessel or tank through which the liquid is passed. The cartridges comprise a tubular element, preferably molded of a resin or plastic, and an exterior filter of a material which can filter out even minute particles of matter, or both minute particles and water. The preferred filter has a combination of such small pore size and hydrophobic characteristics that it can remove small solid particles and prevent the passage of water. The tubular element is of simple construction and the cartridge can easily be assembled and installed in or removed from the vessel or tank by unskilled operators.

The filter element is advantageously formed of tubular sections having interconnecting means to form tubular elements of any desired length having an end closure, and an open coupling end provided with means to effect a sealed connection with the tank. The tubular filter element has additional important features including exterior longitudinal closely spaced grooves and ribs which are preferably so narrow that the ribs can support such delicate filters as microporous plastic membrane filters, and the grooves provide ducts for the removal of the filtered liquid. The sections of the tubular element which are intermediate the ends are interconnected when two or more are used, and to the ends so as to form an annular channel at each connection opening to the interior, which channels are contiguous with the grooves whereby the liquid passing through the filter enters the grooves and flows into and through the annular channels into the interior of the tubular element.

The tubular element may be provided with various types of filters selected to deal with the particular filter problem. In filtering liquids which do not contain undissolved water or water solutions it is not necessary to use a filter which is hydrophobic. However, in filtering organic liquids containing undissolved water as is the case with aircraft fuel it is necessary to use a membrane filter having the necessary combination of pore size and hydrophobic surface. The microporous plastic membrane filters having a coating of hydrophobic material are especially effective. However, other hydrophobic filters may be used such as sheets of felted spun glass or fabrics of spun glass coated with hydrophobic materials. The plastic membrane filter may be applied over a supporting fabric or it may be covered with any suitable prefilter.

Figure 2:
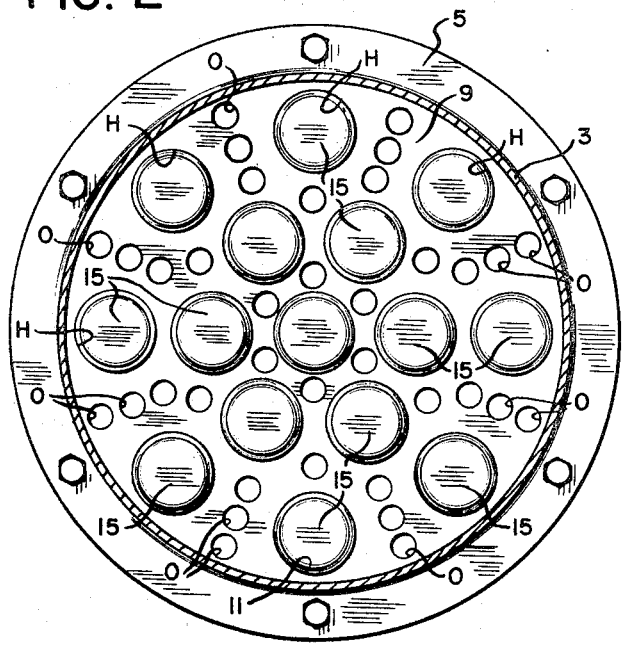
Figure 3:
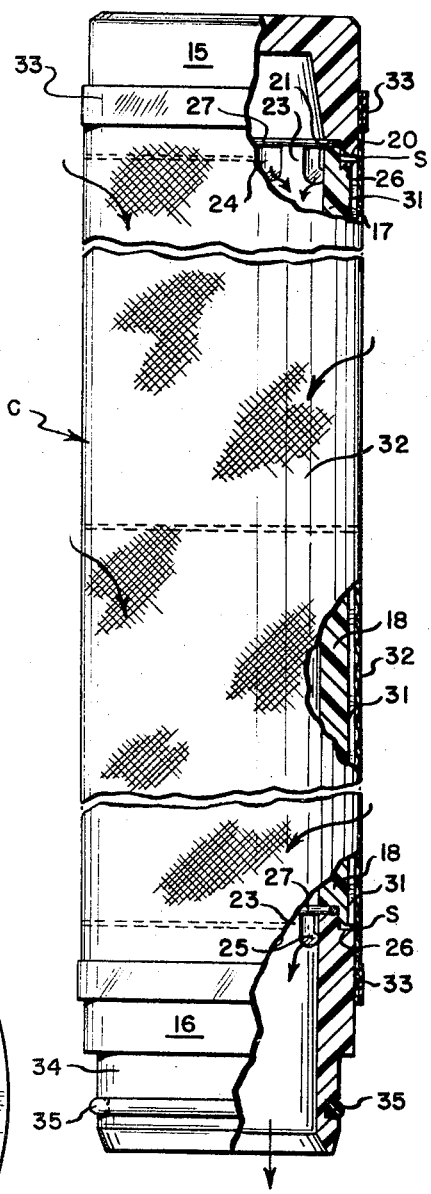
Figure 4:
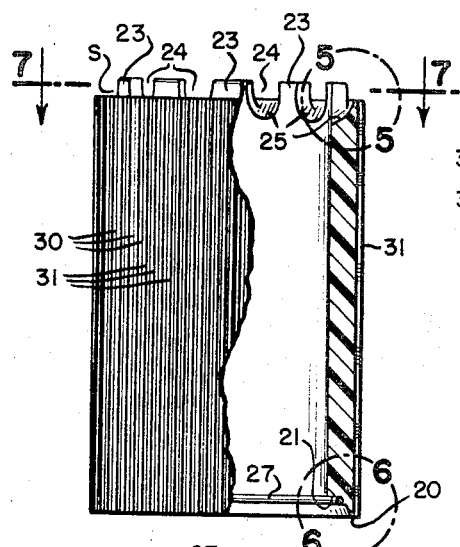
Figure 7:
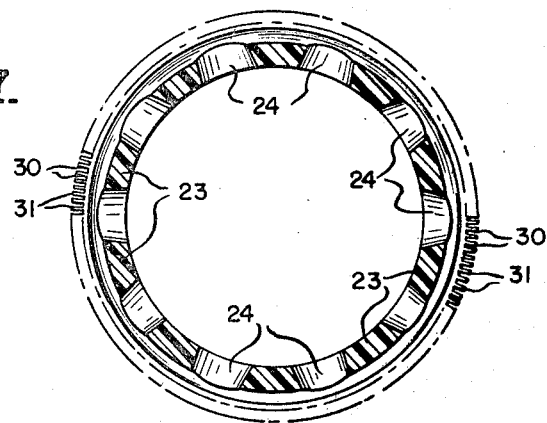
Figure 5:
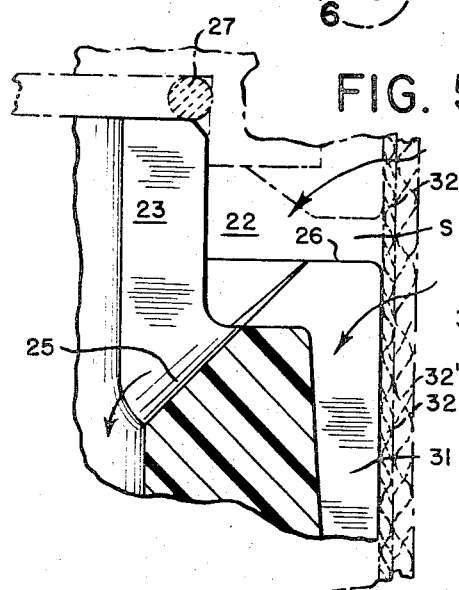
Figure 8:
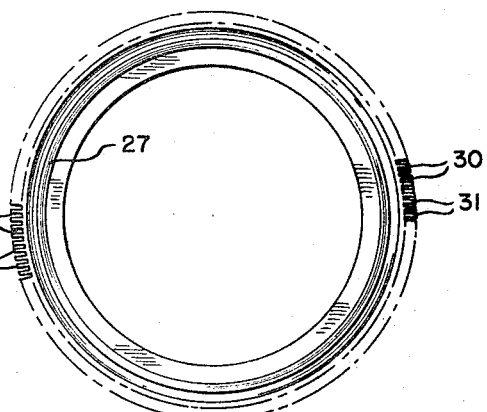
Figure 6:
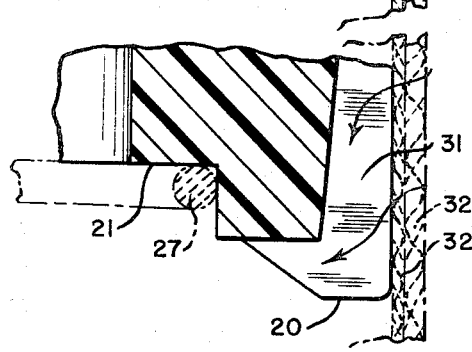
Figure 9:
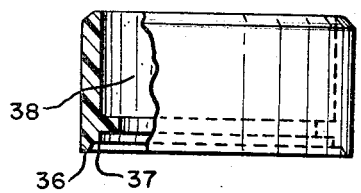

These and other novel features of the invention will be understood after considering the following discussion and accompanying drawings in which FIG. 1 is a side elevation, partly in section, illustrating an assembly of filter cartridges of the invention in a tank;
FIG. 2 is a sectional view at 2—2 of FIG. 1;
FIG. 3 is an enlarged side view, partly in section, of a filter cartridge of the invention as used in FIG. 1;
FIG. 4 is a side view, partly in section, of one intermediate section of the tubular element of FIG. 3;
FIG. 5 is an enlarged sectional view at the area 5—5 of FIG. 4, modified to show a filter and a prefilter;
FIG. 6 is an enlarged sectional view at the area 6—6 of FIG. 4, modified to show a filter and a prefilter;
FIG. 7 is a sectional view at 7—7 of FIG. 4;
FIG. 8 is an end view at 8—8 of FIG. 4, and
FIG. 9 is a side view, partly in section, of a coupling end cap.

The tank 1 and assembly of cartridges C is a unit of the type which may be used to filter aviation fuel and the like. The tank comprises a cylindrical shell 2 to which a cover 3 having an inlet pipe 4 is attached by flanges 5 to the shell 2 and a bottom closure 6 attached by flange 7 to the shell 2 having an outlet pipe 8. A flat spacer plate 9 having holes H for the insertion of the end closures 15 of the cartridges C is mounted in the tank and secured by the flange 5. Another flat spacer plate 12 having holes H' for the insertion of the open coupling ends 16 of the cartridges is mounted in the tank and secured by the flange 7. The plate 12 has a water bleed pipe 13 for the removal of water which accumulates on the upper inside surface.

The fuel being filtered enters through pipe 4 and since plate 9 has several openings O the fuel can flow into the space within the shell 2 and maintain it filled so that all of the exterior surfaces of the cartridges C are in contact with the fuel which may be under any desired pressure. The fuel passes through the filters to the hollow interior of the cartridges and out the open coupling ends in a manner to be described hereinafter, and is discharged through pipe 8. It is to be understood that the assembly of FIG. 1 is more or less diagrammatic to illustrate one of the many uses for which the cartridges C are suitable.

The cartridge shown in FIG. 3 comprises a tubular element molded of a plastic such as polypropylene consisting of an end closure 15, an open outlet coupling end 16, and one or more intermediate sections 17 and 18. The use of intermediate sections connected together is a means for producing a tubular element of any desired length and overcoming the limitations of extrusion molding. The end closure 15 is generally cup-shaped and, as shown in FIGS. 3 and 6, has a flat transverse end 20 and an inner annular recess 21. The intermediate sections and the ends are advantageously connected together by induction heating which is described hereinafter. One end of each intermediate section has a recessed end exactly like the recessed end of the end closure 15 and the other end, called the insert end, is constructed to mate with a recessed end. The insert end of the intermediate section and the open outlet end 16 as best shown in FIGS. 4, 5 and 7 consist of an exterior annular recess 22 and an interior annular extension having several segments 23 and interposed spaces 24 each of which has an inwardly sloping arcuate bottom 25. The recess 22 is formed to provide a flat transverse surface 26 which has an important relation to the flat surface 20 on the recessed end.

The recessed end and the insert end fit together with a tight but removable connection and when the ends of the projections 23 strike the bottom of the annular recess 21 this leaves an annular space S contiguous with the openings 24 leading into the hollow opening of the tubular element. This connection is preferably made permanent by plastic fusion. To effect one kind of permanent connection, a ring of metal 27 is inserted into the annular recess 21 and then the insert end is pushed into position with the ends of projections 23 bearing on the ring. The ring is heated in a high-frequency induction field to melt the adjacent plastic and fuse the two parts together, care being taken to maintain the proper width of space S. Other connections may be used such as a one-quarter thread or a bayonet coupling. The assembly of an end closure, an open outlet coupling end and one or more intermediate sections forms a tubular element which is exteriorly cylindrical.

Each intermediate section has longitudinally extending grooves 30 and interposed ribs 31, the dimensions of which are selected to provide efficient liquid flow and filter support, and may vary, say, in width from 0.020 to one-eighth inch, and be of any desired depth. The grooves may be formed in the molding of the plastic section or machine cut. In producing intermediate filter sections with a 2 inch O.D. and groove widths of, say, 0.02 inch the maximum length by injection molding is about 3 to 5 inches. Our induction heating technique which fuses the sections together achieves an important means of producing filter cartridges of any desired length.

The open outlet end 16 has a neck portion 34 which makes a tight fit in the holes H' of plate 12 and the O-ring 35 recessed in the neck effects a liquid tight connection in the hole H'.

Two or more of the tubular elements may be connected together by substituting the coupling of FIG. 9 for the end cap 15 of FIG. 3. This coupling has a flat transverse end 36 and a recess 37 exactly like the corresponding parts 20 and 21 of cap 15 and a cylindrical center 38 into which the neck 34 of end 16 can be inserted to connect two tubular elements together.

The cartridge of FIG. 3 is formed by applying over the assembled tubular element an exterior filter 32 such as a wrapping or sleeve. It is most advantageous in the filtering of aviation fuel to use a microporous plastic membrane filter having a pore size, for example of from 1.0 micron to 100 millimicrons which has been treated as with a silane such as dimethyl dichlorosilane to make it hydrophobic and which is preferably reinforced with a fabric such as a Dacron monofilament fabric. When a wrapping of such plastic filter is used, the longitudinal edges are overlapped and the ends are secured to the closed end and open outlet coupling end by a surrounded band of plastic 33 which may be heat-shrunk into tight connection. In order to provide for the use of relatively high pressure on the liquid being filtered, for example, a pressure differential of over 100 p.s.i., we may apply a monofilament nylon mesh directly over the tubular element as an under support for the membrane filter.

In order to extend the life of the delicate membrane filter it may be covered with a prefilter of any suitable type. A prefilter may be wrapped directly over the plastic membrane filter in one or more layers for prefiltration. The end surface of the prefilter may be fused by means of an epoxy or suitable potting compound, and the edges may be sealed to the end cap with a sealant or with a piece of irradiated shrinkable tubing. Another type of prefilter may be formed of glass fibers of different densities formed over a mandrel and held together with an epoxy binder. This preformed tubular prefilter is so proportioned that the inside diameter is just slightly larger than the outside diameter of the filter cartridge so that filter cartridge can be inserted into the preformed prefilter, and then the preformed prefilter is sealed directly to the filter cartridge. The prefilters may be treated with a hydrophobic coating material. A prefilter 32' of the aforementioned types is shown in FIG. 5 applied over the filter 32.

In a typical operation for filtering aviation fuel the fuel is pumped through pipe 4 and flows through the openings in plate 9 as shown by the arrows and through the filters 32 of the cartridges C. The filtered liquid flows along the grooves 30 to the annular channels S and through the openings 25 into the interior from which it flows to the outlet pipe 8.

By reason of the hydrophobic character of the filter 32, the water in the fuel is repelled and does not pass through but trickles downward to plate 12 and flows out of the tank through pipe 13.

We claim:

1. The improved filter cartridge which comprises a tubular element having an unobstructed hollow interior and defined by an end closure, an open outlet coupling end and at least one intermediate section secured between the end closure and the coupling end along the wall portions thereof with the end closure and the open outlet coupling end connected to only the next adjacent one of said intermediate sections, each intermediate section having exterior longitudinal closely spaced grooves and ribs, an annular channel on each intermediate element contiguous with the grooves connecting with the interior of the tubular element, and a filter in secured connection on the tubular element.

2. A filter cartridge as defined in claim 1 in which the filter is a microporous plastic membrane filter.

3. A filter cartridge as defined in claim 1 in which the filter is a hydrophobic microporous plastic membrane filter.

4. A filter cartridge as defined in claim 1 which comprises a first annular channel between the end closure and the intermediate section adjacent to said end closure, a second annular channel between the open coupling end and the intermediate section adjacent to said open coupling end, and a third annular channel between each intermediate section, said channels providing passages for the flow of liquid from the grooves.

5. A filter cartridge as defined in claim 1 which comprises a prefilter overlying the filter.

6. A filter cartridge as defined in claim 1 wherein each of said intermediate sections has a male insert end and a complimentary shaped female recessed end, one of said end closure and open outlet coupling end has a male insert end complimentary to the female recessed end of each intermediate section and the other of said end closure and open outlet coupling end has a female recessed end complimentary to the male insert end of each intermediate section.

7. The improved filter cartridge which comprises a tubular element of plastic material having an unobstructed hollow interior and consisting of an end closure, an open outlet coupling end, and at least one intermediate section secured together along the wall portions thereof with the intermediate sections disposed between the end closure and the open outlet coupling end and with the end closure and the open outlet coupling end connected to only the next adjacent one of said intermediate sections, end channel means leading to the interior of the tubular element, a multiplicity of closely spaced longitudinal ribs and grooves on each of the intermediate sections which grooves connect with the channel means, a microporous plastic membrane filter surrounding the intermediate sections and in secured connection thereto, whereby liquid passing through the filter enters the grooves and flows through the channel means into the tubular element and out the open coupling end.

8. A filter cartridge as defined in claim 7 in which the plastic membrane filter is reinforced with fabric and coated with a hydrophobic material.

9. A filter cartridge as defined in claim 7 in which the filter is a sheet mateiral surrounding the intermediate sections and overlapping both the end closure and the coupling end, and binding means securing the sheet material to the end closure and the coupling end.

10. A filter cartridge as defined in claim 7 which comprises a prefilter surrounding the plastic membrane filter.

11. A filter cartridge as defined in claim 7 in which the intermediate section is in fused connection with the end closure and the outlet coupling end.

References Cited

FOREIGN PATENTS 561,815 11/1957 Belgium.
538,062 3/1957 Canada.
698,751 10/1953 Great Britain.

REUBEN FRIEDMAN, *Primary Examiner.*

F. A. SPEAR, *Assistant Examiner.*